(12) United States Patent
Triulzi

(10) Patent No.: US 10,508,258 B2
(45) Date of Patent: Dec. 17, 2019

(54) PROCESS FOR STABILISING OF ALCOHOLIC DRINKS AND PRECURSORS AND DERIVATIVES THEREOF

(75) Inventor: Giovanni Triulzi, Mesero (IT)

(73) Assignee: ESSECO S.r.l., San Martino di Trecate (IT)

( * ) Notice: Subject to any disclaimer, the term of this patent is extended or adjusted under 35 U.S.C. 154(b) by 0 days.

(21) Appl. No.: 14/009,891

(22) PCT Filed: Mar. 29, 2012

(86) PCT No.: PCT/EP2012/055601
§ 371 (c)(1),
(2), (4) Date: Oct. 28, 2013

(87) PCT Pub. No.: WO2012/136554
PCT Pub. Date: Oct. 11, 2012

(65) Prior Publication Data
US 2014/0099413 A1    Apr. 10, 2014

(30) Foreign Application Priority Data

Apr. 6, 2011  (IT) .............................. MI2011A0569

(51) Int. Cl.
*C12H 1/14* (2006.01)
*A23L 2/52* (2006.01)
*A23L 2/70* (2006.01)

(52) U.S. Cl.
CPC .................. *C12H 1/14* (2013.01); *A23L 2/52* (2013.01); *A23L 2/70* (2013.01)

(58) Field of Classification Search
None
See application file for complete search history.

(56) References Cited

U.S. PATENT DOCUMENTS

| | | | | |
|---|---|---|---|---|
| 3,812,272 | A * | 5/1974 | Linville | .................. 426/592 |
| 4,601,981 | A * | 7/1986 | Vieth | ................. C12N 11/02 |
| | | | | 435/105 |
| 2009/0004360 | A1* | 1/2009 | Bingley et al. | ............... 426/590 |
| 2010/0160232 | A1* | 6/2010 | Takahashi | ............. A23L 1/0156 |
| | | | | 514/21.2 |

FOREIGN PATENT DOCUMENTS

| | | | |
|---|---|---|---|
| CN | 102766538 A | * | 11/2012 |
| EP | 0 140 044 | | 5/1985 |
| EP | 0 962 522 | | 12/1999 |
| EP | 1 240 306 | | 9/2002 |
| JP | 60130367 | * | 7/1985 |
| JP | 1 165357 | | 6/1989 |
| JP | 2007 104920 | | 4/2007 |
| WO | 2008128972 | | 10/2008 |
| WO | 2009092832 | | 7/2009 |
| WO | 2010133543 | | 11/2010 |
| WO | WO 2010133543 A2 | * | 11/2010 |

* cited by examiner

*Primary Examiner* — Tamra L. Dicus
(74) *Attorney, Agent, or Firm* — Bay State IP, LLC

(57) ABSTRACT

Process for the stabilizing of alcoholic drinks and precursors and derivatives thereof, consisting in adding thereto a solution containing polyglutamate and/or polyaspartate. The stabilization obtained is not only against tartrate precipitation, but also for colour stability and against oxidation. Such process basically provides the use of a composition containing polyglutamate, polyaspartate or a mixture of the two substances.

7 Claims, No Drawings

PROCESS FOR STABILISING OF ALCOHOLIC DRINKS AND PRECURSORS AND DERIVATIVES THEREOF

CROSS REFERENCE TO RELATED APPLICATION

This application is for entry into the U.S. National Phase under § 371 for International Application No. PCT/EP2012/055601 having an international filing date of Mar. 29, 2012, and from which priority is claimed under all applicable sections of Title 35 of the United States Code including, but not limited to, Sections 120, 363 and 365(c), and which in turn claims priority under 35 USC 119 to Italian Patent Application No. MI2011A000569 filed on Apr. 6, 2011.

FIELD OF THE INVENTION

The present invention refers to a process for the stabilising of alcoholic drinks, in particular wines, and of the precursors (for example fruit juices and musts) and derivatives (for example vinegar) thereof, imparting thereto colour stability and stability in oxidation conditions.

BACKGROUND OF THE INVENTION

Various alcoholic drinks, but particularly wine, once produced and bottled, may undergo further processes. Subsequent positive processes during ageing impart more interesting sensory features, especially for high-quality or very-high-quality wines. However, there are also negative processes, which lead to impair the wine quality.

Oxidation reactions take place in the bottle in the presence of small or very small amounts of air, normally in the presence of iron and/or copper ions. Such reactions cause compounds responsible for the organoleptic qualities of a wine, such as flavours, pigments and tannins, to degrade. It is suitable for the wine to be stabilised with respect to these oxidation reactions. Up until today, the most effective strategy has been that of reducing or removing metal content in wine. In this sense ferros cyanidation is highly effective; however, such process is extremely delicate, since too small an amount causes the wine not to be stabilised and too high an amount, with the resulting presence of deposits, leads to health damages. For these reasons, such practice is now virtually abandoned and has been almost entirely replaced by a series of measures in the manufacturing stages, aimed at avoiding contact with metals or at the use of coadjuvants, such as caseinate, which adsorb and remove part of the metals. In any case, the procedures are less effective than ferros cyanidation.

Another fundamental aspect of wine is the colour thereof. In red wine the colour is due to a series of phenol complexes, found in wine and coming mostly from the grapes skins. Over time, such complexes tend to polymerise and to form a precipitate. Such drawback today is faced with specific tub procedures, such as microoxigenation, ageing, clarification, refrigeration and others. In other cases gum arabic is added.

However, the most common instability seems to be the one due to potassium bitartrate, generically called tartaric instability.

At the wine pH, the naturally occurring tartaric acid in wine is dissociated in various forms; the prevailing one is hydrogen-tartrate or bitartrate ($HT^-$) which reacts with potassium, itself contained abundantly in wine. The tartrate ion ($T^{2-}$) reacts instead with bivalent cations, in particular with calcium.

Wine has a concentration of these anions often exceeding the solubility product thereof, which determines a state of oversaturation. A meta-stable situation hence occurs, in which there is no tartrate crystal forming and precipitation due to the simultaneous presence of other agents which act as protective colloids. However, also a slight change of the environmental conditions, for example a temperature drop during transportation and storage, can change the equilibrium and lead to crystallisation phenomena in the bottle, with the resulting formation of precipitates.

Instability with regard to these phenomena is measured with various tests. The most common one is the electric conductivity drop, measured in $\Delta\mu S/cm$. The smaller this value, the more stable to tartaric precipitation the wine.

So far various strategies exist to reduce to a minimum this risk. In certain cases, before bottling, wine is brought to a temperature below 0° C., possibly adding bitartrate crystals, so that precipitation occurs before bottling and the wine can be bottled after filtering. Although conceptually simple and widely used, however, this strategy has the big drawbacks of employing large amounts of energy to reduce and keep the temperature low, of considerably extending processing times and of requiring sprcific equipment which increases the investments necessary for the management of a wine cellar.

Another strategy is that of removing from the wine part of the excess cations; the preferred technique to actuate this strategy is electrodialysis, which, however, also implies costly and delicate equipment, difficult to be available for small manufacturers, and which implies high water consumption and the creation of large amounts of wastewater.

Finally, the last strategy consists in adding crystallisation inhibitors. This path is preferable to others, since it has no adverse environmental effects and can be applied also in very small companies. From as far back as the '50s, the use of metatartaric acid has been suggested and adopted, a substance obtained through esterification by thermal processing of tartaric acid, capable of inhibiting the formation of bitartrate crystals. The limit of metatartaric acid, which is inexpensive and easily employable, is the short duration of the inhibiting effect, which tends to disappear after a few months, especially following accidental heating of the wine.

In order to inhibit crystallisation, mannoproteins with specific molecular weight are employed, extracted from yeast, as proposed by Maine and Dubordieu as well as by Lankhorste et al.

The limit of this technique is the high cost of the product and the variableness of results in certain wine types.

Another inhibitor recently authorised in Europe is carboxyimethylcellulose (CMC), a polymer obtained by chemically treating cellulose. It is inexpensive, but in red wines it often causes colour precipitation, in addition to giving sporadic filtering problems and to being little effective in highly unstable wines.

Gum arabic is another tartaric stabiliser used before bottling, even though with a gentler effect and, individually, not sufficient to avoid precipitations in the most critical wines.

US 2010/0119671 A1 discloses a composition for wine stabilising against the precipitation of tartaric acid salts, comprising at least 2.5% of a mixture of peptides having a molecular weight ranging between 3,000 and 10,000.

SUMMARY OF THE INVENTION

According to what has been set forth so far, it would be desirable to find an approach which allows, on its own, to obtain full-scale wine stabilisation, preferably without implying excessive costs, with no risk of harmful agents remaining in the wine, with effects as long-lasting as possible and which imply the production of acceptable levels of wastewaters and modest water consumption.

Such object is achieved, according to the present invention, through a process for the stabilisation of alcoholic drinks and precursors and derivatives thereof, consisting in adding thereto a composition containing polyglutamate and/or polyaspartate.

BEST WAY TO CARRY OUT THE INVENTION

The present invention refers to a process for stabilising an alcoholic drink, such as wine, vermouth, liqueurs and the like, a precursor, typically a fruit juice or a must, or a derivative, such as typically vinegar. The stabilisation obtained is not only against tartrate precipitation, but also for colour stability and against oxidation. Such process basically provides the use of a composition containing polyglutamate, polyaspartate or a mixture of the two substances.

These substances belong to the class of polyaminoacids, polymers the repeating unit of which is an aminoacid. These substances are perfectly biodegradable and non-toxic. Polyglutamate and polyaspartate are substances known per se. In particular, polyaspartate is used nowadays as a component of insecticides, fertilisers, detergents, as well as being an additive of cement, an anti-corrosion and limescale-removing agent. A particular use is in water treatment. However, neither of the two compounds employed according to the present invention has ever found application in the wine industry. Preferably, the average numeral molecular weight of such polyglutamates and polyaspartates ranges between 1,000 and 30,000.

Without wanting to be bound to theory, it is believed that the stabilising action is due to the high charge density of the two compounds, such as to change the electrochemical balances of the solutions it is a component of. Furthermore, a chelating effect is assumed towards cations and positively-charged agents in wine, so that they are believed to reduce the ability to interact with negatively-charged molecules.

The composition is added to the drink during the treatment thereof, before the final bottling.

The present invention is now illustrated in greater detail, with reference to some examples. They refer to tartaric stability (examples 1, 2 and 3) and to colour stability (examples 3 and 4).

The composition is added to the product to be treated so as to reach a concentration between 1 and 100 g/hl.

If the composition is used in powder, it is added to a small amount of wine or of water, for example so as to obtain a 1:5 v/v dilution, agitating until full dissolution. The solution obtained is added to the liquid to be processed.

If one starts from the liquid form, it is diluted in a small amount of wine or water (for example 1:5 v/v) until it is homogeneous and then it is added to the liquid to be processed.

The addition is preferably made after the finishing classifications, a few days before bottling.

EXAMPLE 1

Some samples of different wines, white and red ones, have been treated with a series of substances, adding 5 g or 10 grams, respectively, of a series of different stabilisers for each hectolitre of wine. Wines having high instability with respect to tartaric precipitation have been chosen, since such wines, before the treatment, have $\Delta\mu S/cm$ above 30. A value of $\Delta\mu S/cm$ below 20 is considered acceptable. As stabilisers, metatartaric acid (AMT), carboxymethylcellulose (CMC) and sodium polyaspartate (PAA—according to the present invention) have been used. The results are reported in Table 1.

TABLE 1

Stabilisation of some wines with different substances. Data in $\Delta\mu S/cm$ at 30° C.

| Wine | As such | +5 g/hl AMT | +10 g/hl AMT | +5 g/hl CMC | +10 g/hl CMC | +5 g/hl PAA | +10 g/hl PAA |
|---|---|---|---|---|---|---|---|
| Trebbiano | 230 | 19 | 13 | 51 | 33 | 20 | 16 |
| Chardonnay | 146 | 14 | 12 | 28 | 22 | 15 | 10 |
| Sangiovese | 68 | 14 | 10 | 68 | 33 | 15 | 14 |
| Cabernet | 115 | | 13 | | | | 15 |
| Trebbiano | 230 | | 21* | | | | 14* |
| Verdicchio | 126 | | 135** | | | | 12** |

*The additives used have undergone a thermal treatment at 80° C. for 3 hours.
**The additives used have undergone a thermal treatment at 40° C. for one day.

It can be immediately noticed that the effectiveness of polyaspartate, the dosages being equal, is at least the same as that of metatartaric acid and greater than carboxymethylcellulose. Moreover, it is noticed that polyaspartate is more stable than metatartaric acid. As a matter of fact, when they undergo prolonged thermal treatment, the metatartaric acid tends to lose its properties, while polyaspartate maintains them, as can be seen from the last two table rows.

EXAMPLE 2

In this example the filterability of a wine treated according to the present invention over an untreated wine is verified. The treated and untreated wine has been made to pass through a membrane with porosity 0.45 µm, at a pressure of 2 bar and at a temperature of 20° C. The filterability index (T2-2T1, see below) and the modified filterability index [(T3-T1)-2(T2-T1)] are measured. A wine is considered filterable if the modified filterability index is below 10. The results are reported in Table 2.

TABLE 2

Influence of polyaspartate addition on wine filterability

| Filtered volume (ml) | | Eluition time for untreated Chardonnay (s) | Eluition time for Chardonnay treated with 10 g/hl of PAA (s) |
|---|---|---|---|
| 100 | | 23 | 23 |
| 200 | T1 | 47 | 48 |
| 300 | | 73 | 73 |
| 400 | T2 | 98 | 98 |
| 500 | | 125 | 125 |
| 600 | T3 | 153 | 152 |
| Filterability index | | 4 | 2 |
| Modified filterability index | | 4 | 4 |

The experiment just reported shows that the addition of polyaspartate does not damage filterability, unlike what happens when carboxyimethylcellulose is added, which causes—especially in red wines—colloidal instability phenomena and subsequent clogging of the filtering systems.

EXAMPLE 3

This example highlights the stabilising properties both towards tartaric precipitation, and with regard to colour.

A white wine and a red wine have been compared, assessing the possible formation of precipitates with no additions and with additions of crystallisation inhibitors. After the additions, the wines have been kept at −4° C. for 28 days. The results are reported in Table 3, where GA is gum arabic.

TABLE 3

| Wine | Wine as such | +10 g/hl PAA | +10 g/hl AMT | +10 g/hl GA |
|---|---|---|---|---|
| Chardonnay ΔμS/cm at 30° C. = 146 | Presence of tartrate crystals | No precipitate | No precipitate | No precipitate |
| Sangiovese ΔμS/cm at 30° C. = 68 | Presence of tartrate crystals and colouring matter | No precipitate | Deposit of colouring matter | Deposit of colouring matter + calcium tartrate-malate |

The experiment just described allows to see that, as far as Chardonnay is concerned, the stabilising effect of PAA is comparable to that of AMT and GA. In red wine, the stabilising effect of PAA is dramatically higher.

Summary of the results of the experiments of tartraric stabilisation

As seen, PAA, preventing ions—which, however, remain present in solution—from salifying around precipitation nuclei until reaching a size which determine visual perception, allows to reach and maintain in time a high, virtually complete tartaric stability in red and white wines, without damaging the filterability and colour of the treated wines.

The technique according to the present invention replaces with at least equal effectiveness, but usually with greater one, the practices already in use, is applicable in any type of manufacturing situation and has no contraindications from an environmental point of view.

It must also be noted that the technique according to the present invention is not of a subtractive type, since it eliminates no wine component, maintaining the integrity thereof unchanged. The wine can be treated according to the present invention both during the processing steps and before the final packaging.

EXAMPLE 4

A Portuguese red wine from Alentejo has been cold treated with polyaspartate, subjecting the sample to spectrophotometry, after filtration, in a 1-mm-thick cuvette.

| | Data after cold testing | | | |
|---|---|---|---|---|
| | Test | 10 AMT | 10 CMC | 10 PAA |
| 420 nm | 4.03 | 3.84 | 3.3 | 3.9 |
| 520 nm | 5.16 | 4.92 | 4 | 5.18 |
| 620 nm | 1.09 | 1.03 | 0.83 | 1.06 |
| IC (colouring intensity) | 10.28 | 9.79 | 8.13 | 10.13 |
| T (shade) | 0.78 | 0.78 | 0.83 | 0.75 |
| Change % D.O. 520 nm compared to Test | | −4.65 | −22.48 | +0.39 |

The cold test, 72 h at −4° C., is much more severe than the one which is normally used in wine cellars (24 hours at 0° C.) such test has been carried out that way to highlight the positive effect of PAA compared to the other tartaric stabilisation coadjuvants on antocyan balances also in extreme destabilising conditions.

However, it is understood that the invention must not be considered limited to the particular examples illustrated earlier, which represent only an exemplifying embodiment threof, but that a number of modifications are possible, all within the reach of a person skilled in the field, without departing from the scope of protection of the invention, as defined in the following claims.

The invention claimed is:

1. A process for the stabilizing of alcoholic drinks and precursors and derivatives thereof, consisting of adding thereto a composition containing polyaspartate.

2. The process as claimed in claim 1, wherein the alcoholic drink is selected from the group consisting of: wines, vermouth, liqueurs, beers, whiskey, and cider.

3. The process as claimed in claim 1, such wherein the precursor is selected from the group consisting of: fruit juices and musts.

4. The process as claimed in claim 1, such wherein the alcoholic drink derivative is vinegar.

5. The process as claimed in claim 1, wherein the polyaspartate possesses an average numeral molecular weight ranging between 1,000 and 30,000.

6. The process as claimed in claim 1, the composition concentration ranges between 1 and 100 g/hl.

7. The process as claimed in claim 1, characterized in that said composition is added after a finishing classifications.

* * * * *